United States Patent Office 3,573,215
Patented Mar. 30, 1971

3,573,215
TETRABROMOPHTHALIC ANHYDRIDE COMPOSITIONS
Richard C. Nametz, St. Louis, and Robert J. Nulph, Alma, Mich., assignors to Michigan Chemical Corporation, St. Louis, Mich.
No Drawing. Continuation of abandoned application Ser. No. 551,883, May 23, 1966, which is a division of application Ser. No. 282,208, May 22, 1963. This application June 6, 1968, Ser. No. 739,935
Int. Cl. C09k 3/00; C08f 5/00
U.S. Cl. 252—192　　　　　　　　　　　　　12 Claims

ABSTRACT OF THE DISCLOSURE

Compositions of impure, oleum produced tetrabromophthalic anhydride with small amounts of inorganic and organic bases and salts are described. Impure, oleum produced tetrabromophthalic anhydride contains catalytic acidity occluded in the crystals which interferes with the reaction of tetrabromophthalic anhydride with polyols to produce polyester compositions because of side reactions which cyclize the polyols. Small amounts of inorganic and organic bases and salts are used to deactivate the catalytic acidity. The compositions are particularly useful for preparing polyester resins.

---

This application is a continuation of application Ser. No. 551,883, filed May 23, 1966, now abandoned, which in turn is a division of application Ser. No. 282,208, filed May 22, 1963, now Pat. No. 3,285,995 for Self-Extinguishing Resinous Compositions.

This invention relates to novel, self-extinguishing polyester resin compositions incorporating tetrabromophthalic anhydrides and their method of preparation. Further still, this invention relates to novel tetrabromophthalic anhydride compositions useful in the preparation of diesters and particularly novel, self-extinguishing polyester resin compositions. Further still, this invention relates to novel, self-extinguishing resin compositions incorporating tetrabromophthalic anhydride and an additive such as triethyl phosphate in order to reduce the weight percent of bromine necessary to impart self-extinguishing properties.

The term "self-extinguishing" as used in this specification and applied to polyester resins is defined to include a polyester resin which will not burn after the withdrawal of a flame from contact with the resin. The polyester resins of the present invention are at least self-extinguishing and are under some circumstances non-burning. A more quantitative definition of this term is set forth in ASTM D-757 and the following discussion in the specification.

The polyester resins have been well known to the prior art for many years. They are generally classified into two groups, i.e. the saturated polyester resins and the unsaturated polyester resins. When both the acid and the di- or polyhydric alcohol are saturated, that is having no double or triple bonds between adjacent carbon atoms, the reaction product is a saturated polyester resin. They produce linear polymers which are thermoplastic. These saturated linear polyesters have found use as plasticizers for cellulose nitrate, various elastomers and other resins. They have also been used to a limited extent in calking and adhesive compositions. A well known product in this group is the fiber forming poly (ethylene terephthlate). This saturated polyester resin is used to make fibers which are woven into clothing fabrics.

By far the largest group of polyester resins are the unsaturated resins. These polyester resins are characterized by the fact that there is some active carbon to carbon unsaturation in either the acid or di- or polyhydric alcohol and, thus, the polyester resin reaction product contains this unsaturation. When this polyester resin is mixed with a suitable cross-linking agent and a curing agent added, a thermoset polyester resin is produced. A well known member of this class of polyester resins is the reaction product of phthalic and maleic anhydride with ethylene glycol which forms a linear unsaturated polyester resin. This resin is in general mixed with a polyester resin cross-linking agent, such as styrene or other vinyl monomers, and cured with a curing agent, such as an organic peroxide, to form a thermoset polyester resin.

The various types of polyester resins are well known to the prior art and are set forth in "Polymers and Resins, Their Chemistry and Chemical Engineering" by Brage Golding, published by D. Van Nostrand Company, Inc., (1959), pages 283 to 313, and in the patent literature.

The polyester resins, particularly the thermoset polyester resins, have many desirable properties including strength, elasticity, ability to receive pigmentation, resistance to the weathering elements, abrasion resistance and the like; however, a primary disadvantage is found in their extreme flammability.

The prior art has attempted to overcome the problem of polyester resin flammability by the use of various additives, such as chlorinated paraffins in combination with antimony oxide, chloro- and bromoalkyl phosphates and phosphonates, such as tris (chloroethyl) phosphate, tris (bromoethyl) phosphate, tris (dichloropropyl) phosphate and tris (2,3-diboromopropyl) phosphate which are admixed with the polyester resins. However, this approach has met with limited success, because the large amount of these additives, e.g. 30% or more by weight usually required to make the resin self-extinguishing, seriously affects the properties of the polyester resins. In particular, the strength of the resulting polyester resin is reduced, it is made more flexible, it has a lower heat distortion temperature and its surface is more easily penetrated.

Attempts at imparting self-extinguishing properties directly into the polyester resin itself have utilized chlorine chemically combined in the resin molecule. These are exemplified by the chlorinated aromatic dicarboxylic acids which are mixed with maleic anhydride and various non-halogenated dicarboxylic acids, and then reacted with a di- or polyhydric alcohol to form a chlorinated polyester resin of the unsaturated type. This may in turn be mixed with a polyester resin cross-linking agent and cured. However, it has been found that about 30% or more by weight of chlorine must be incorporated into these polyester resins in order to make them self-extinguishing. Such a substantial amount of chlorine in these polyester resins greatly increases their viscosity and reduces their weatherability. Further, the resulting resins do not easily wet the fiber glass used commercially to make laminates from polyester resins.

The prior art has realized that the chemical incorporation of bromine into a polyester resin should result in a product which was self-extinguishing. However, in practice it was found that a satisfactory polymeric reaction product could not be prepared from tetrabromophthalic anhydride.

The use of tetrabromophthalic anhydride to replace all or part of phthalic anhydride has been suggested by the prior art. For many years, tetrabromophthalic anhydride has been available in developmental quantities but it is reported to be generally unsuitable for use in polyester resins. In some instances, it is reported that no polyester reaction product could even be formed, while in other instances it was reported that the resulting polyester resins exhibited properties definitely inferior to those of the chlorine-containing polyester resins.

It is therefore an object of the present invention to provide novel polyester resin compositions, both saturated and unsaturated, in corporating tetrabromophthalic anhydride which have properties superior to those of the chlorinated polyester resins of the prior art.

Further, it is an object of the present invention to provide novel polyester resin compositions incorporating tetrabromophthalic anhydride which are self-extinguishing and which include substantially smaller amounts of bromine by weight percent than the prior art chlorinated polyester resin compositions.

Further still, it is an object of the present invention to provide novel processes for the preparation of these polyester resins from tetrabromophthalic anhydride.

Another object of the present invention is to provide a novel tetrabromophthalic anhydride compound free of certain troublesome acidic components.

These and other objects will become increasingly apparent to those skilled in the art as the description proceeds.

The objects of the present invention are accomplished by providing a polyester resin reaction product which comprises the polymeric ester reaction product of an acidic component comprising tetrabromophthalic anhydride, which is substantially free from catalytic acidity, with a basic component selected from the group consisting of di- and polyhydric alcohols and mixtures thereof. Further, the objects of the present invention are accomplished by providing a process for the preparation of this polyester resin by the same reaction. The reaction product can be saturated or unsaturated. Further, the unsaturated resins can be blended with various vinyl monomers, such as styrene, and an inhibitor to form a marketable composition which is cured into a thermoset resin by the use of an initiator. Further still, the catalytic acidity in the tetrabromophthalic anhydride can be eliminated by purification or by adding a small amount of an acid neutralizing material selected from the group consisting of inorganic and organic bases and salts.

It is sometimes desirable to incorporate an additive such as triethyl phosphate into these novel polyester resin compositions in order to reduce the weight percent of bromine necessary to produce a self-extinguishing polyester resin.

While the use of tetrabromophthalic anhydride in polyester resins has been suggested in the literature, the attempts by the prior art to produce a satisfactory resin resulted in failure. This was because of the apparent inability of tetrabromophthalic anhydride to form a diester reaction product upon reaction with a di- or polyhydric alcohol. The prior art had therefore concluded that tetrabromophthalic anhydride per se could not be used to produce a commercially acceptable polyester resin.

In general, it was found that the reaction of a di- or polyhydric alcohol with tetrabromophthalic anhydride, prepared in a conventional manner, resulted in the formation of only the half-ester, even when the reaction was conducted over a long period of time. The incompleteness of the reaction was indicated by the every high acid number of the reaction product. Thus, when tetrabromophthalic anhydride was reacted with ethylene glycol, diethylene glycol, propylene glycol or 1,3-butylene glycol, only the half-ester was formed. The result in all cases was to form a semi-crystalline, heterogenous product of no apparent value. An attempt was made to react tetrabromophthalic anhydride and maleic anhydride mixtures with a single glycol from this group. In only one instance was a non-crystalline product of low acid number produced. It was found that the reaction product of the mixture of tetrabromophthalic and maleic anhydrides with propylene glycol (1,2-propanediol) resulted in the formation of a complete reaction product as indicated by the acid number. However, this reaction product was not commercially useful because of premature gelation which occurred both before and after blending with a conventional cross-linking agent, such as styrene. The reaction product of tetrabromophthalic and maleic anhydride mixtures with mixed glycols was then attempted. It was found that a semi-crystalline, heterogenous product resulted in every case except for the following glycol mixtures; propylene-diethylene, butylene-diethylene, butylene-ethylene, and butylene-propylene. In each of these instances, it was found that the reaction resulted in a noncrystalline product having a low acid number. However, these reaction products were not commercially useful, again because of the premature gelatin.

It was known that the prior art has produced polyester resins incorporating mixtures of phthalic anhydride, tetrabromophthalic anhydride and maleic anhydride reacted with propylene glycol in admixture with diethylene glycol to produce a self-extinguishing polyester resin which had relatively poor properties. It was then noted that a polymeric reaction product was formed only when a dihydric alcohol having one of the hydroxyl groups on a secondary carbon atom was used. However, these polyster resins also suffered from the disadvantages of premature gelation occurring near the end of the polymerization reaction, or during or shortly after styrenating the base resin. The resulting cured product had poor physical properties. The structure of the polymeric reaction product was questionable. It was this preliminary work which resulted in the novel compositions of the present invention and the process for their preparation.

Because of the difficulty encountered with tetrabromophthalic anhydride in the formation of a commercially acceptable polyester resin, an attempt was made to determine the reason for this situation since this was not the case with other halogenated aromatic dicarboxylic acids. Apparently this result was peculiar only to tetrabromophthalic anhydride.

The prior art compositions were analyzed to determine whether any unsuspected side reactions were taking place. Unexpectedly, it was found that in all instances large amounts of unpredictable compounds were being formed. In each instance, it was found that the di- or polyhydric alcohol reactant had been cyclized thereby making it unavailable for reaction with the tetrabromophthalic anhydride. Thus, for instance, in the case where the dihydric alcohols, ethylene glycol or diethylene glycol, were used, it was found that a considerable quantity of the cyclic ether 1,4-dioxane was being produced. With other glycols it was found that other cyclic ethers were being formed. Cyclization was further found to exist in the limited cases where there was apparently a complete reaction. Thus, when propylene glycol (1,2-propanediol) was reacted with tetrabromophthalic anhydride alone, or with tetrabromophthalic anhydride in combination with phthalic and maleic anhydrides, it was found that substantial amounts of a cyclic acetal compound were being formed in accord with the following reaction:

(1) 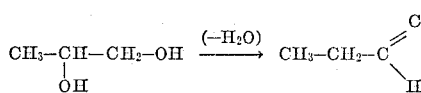

(2) 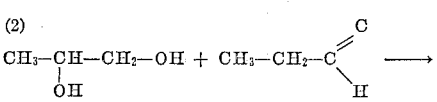

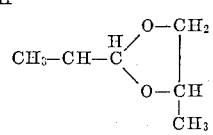

When these products were formed in the preparation of a saturated or unsaturated polyester resin composition, it was found that the glycol was used up without polymerization and the reaction then stopped. As a result, the esterification was only partially completed and crystallization of low molecular weights products occurred. When a large excess of glycol was used, it was possible to esterify to 90–95% completion. However, the glycol losses were high and the product when combined with a vinyl monomer, such as styrene, was subject to premature gelation. Thus, the explanation for the poor properties of the prior art polyester resins incorporating tetrabromophthalic anhydride was found and an attempt was made to find the causative agent, which led to the novel polyester resins of the present invention.

It was thought that since tetrabromophthalic anhydride was prepared commercially using oleum (fuming sulfuric acid that a residual acidity in the tetrabromophthalic anhydride was catalyzing the cyclization reactions. However, when tetrabromophthalic anhydride was washed with copious amounts of water or basic solutions, the cyclization reactions still occurred. It was postulated that occluded impurities (particularly sufuric acid) in the tetrabromophthalic anhydride crystals prevented the successful aplication of the washing techniques.

Unexpectedly, it was then found that when tetrabromophthalic anhydride was subjected to a purification procedure which insured the removal of any residual acidity, it would react with all di- and polyhydric alcohols in the same manner as other di- acids, and that there was no formation of cyclization products. The preferred procedure for the purification of impure tetrabromophthalic anhydride was to dissolve it in dilute sodium hydroxide until all of the solids were dissolved except those which could not be dissolved upon long digestion. These solids were filtered from the solution and discarded and were considered to be caustic insolubles. The filtrate was then treated with dilute hydrochloric acid which precipitated tetrabromophthalic acid. The precipitated acid was filtered, reslurried with fresh hot water and filtered several times to remove sodium chloride formed in the reaction. The tetrabromophthalic acid was then heated for several hours at 150° C. in an air circulating oven to convert the tetrabromophthalic acid to tetrabromophthalic anhydride. The resulting product was substantially pure tetrabromophthalic anhydride which was thus free from catalytic acidity. Illustrative of an effective process for the purification of tetrabromophthalic anhydride is Example I.

EXAMPLE I

A five liter, three neck flask equipped with a stirrer, dropping funnel and thermometer was charged with 176 grams (4.4 moles) of reagent grade sodium hydroxide and dissolved in 1500 milliliters of deionized water. To this caustic solution in the flask was added 928 grams (2 moles) of impure tetrabromophthalic anhydride (M.P. 274–275° C.) and 2000 milliliters of deionized water. This mixture was heated to 70° C. and stirred until only a haze of insoluble materials remained in the solution. This haze consisted of particles of material which were insoluble in the sodium hydroxide. They were removed from the solution by filtering. The heated filtrate was returned to the five liter flask and, with stirring, 473 grams of concentrated hydrochloric acid was added slowly from the dropping funnel. The acid addition caused a very thick slurry of precipitated tetrabromophthalic acid to form so that 300 milliliters more of water was added to facilitate the stirring. The temperature of the precipitated tetrabromophthalic acid and water slurry was kept at 70–90° C. for one hour. The precipitate was then filtered to remove the gross amount of the water soluble sodium chloride formed in the reaction. The solid tetrabromophthalic acid was slurried in a four liter beaker with 2500 millilters of deionized water and transferred back to the five liter flask, washing with 500 milliliters of hot water. This slurry was stirred at 80–90° C. for one-half hour and then refiltered. This solid was again reslurried at 90° C. for one and one-half hours. The solid was filtered out of the slurry and washed three times with 700 milliliter portions of hot water. Finally, the solid, which consisted of tetrabromophthalic acid, was put on a glass dish and dried at 150° C. for six hours to remove both contained water and the chemically combined water, thus forming tetrabromophthalic anhydride. There were 853.5 grams of tetrabromophthalic anhydride. isolated from this batch which resulted in a 92% efficiency. The product had a neutral equivalent of 234 and a melting point of 278–280° C. This product was effectively used in forming polyester resins.

A means of further purification was to dissolve the above purified crystals of tetrabromophthalic anhydride in hot dioxane solvent in a ratio of 1 gram of tetrabromophthalic anhydride per 5 grams of dioxane and the filtering of the solution to remove insolubles. The solvent was then cooled and the pure tetrabromophthalic anhydride precipitated out. The tetrabromophthalic anhydride was found to have a neutral equivalent of 234.1 and a melting point of 282–284° C.

A general procedure for the purification of tetrabromophthalic anhydride is set forth in a prior art publication by Pratt and Young, Journal of American Chemical Society 40:1416 (1918). In this procedure, xylene was used to recrystallize the tetrabromophthalic anhydride which resulted in a product which had the same melting point (i.e. 274–275° C.) as the starting material, thus indicating the presence of some impurity, including residual acidity. The tetrabromophthalic anhydride so produced has been found unsuitable for the production of polyester resins.

It will be appreciated that other methods of purification of tetrabromophthalic anhydride to remove residual acidity can be used. It will be appreciated, however, that the process of Example I is preferred.

Purified tetrabromophthalic anhydride substantially free from acidity was used to prepare the novel polyester resin compositions of the present invention which are characterized by the fact that no cyclic ethers or other cyclic side reaction products, such as the cyclic aetals, are formed in the esterification.

The term "catalytic acidity" as used in this specification is defined to mean that acidity associated with tetrabromophthalic anhydride which catalyzes the side reactions to form the cyclic ethers or cyclic acetals. It is the deactivation of this catalytic acidity by the purification of or the addition of inorganic and organic bases and salts to tetrabromophthalic anhydride which contributes very materially to the production of the polyester resins of the present invention. In general, these polyester resin compositions were prepared either by fusion or the solvent methods well known to the prior art in the preparation of polyester resins.

Illustrative of the novel saturated and unsaturated polyester resin compositions of the present invention and their method of preparation is Example II, which shows the formation of the preferred unsaturated polyester resins.

EXAMPLE II

To a five hundred millimeter, three neck flask, equipped with a thermometer, stirrer, reflux column and condenser, were charged 116 grams (0.25 mole) of purified (treated by the process of Example I and recrystallized from dioxane) tetrabromophthalic anhydride (M.P. 282–284° C.), 38 grams (0.26 mole) of phthalic anhydride, 69 grams (0.7 mole) of maleic anhydride and 122 grams (1.60 moles) of propylene glycol (1,2-propanediol). Nitrogen gas was introduced into the flask thereby eliminating any air and blanketing the contents from the air. The flask was heated and as soon as the mixture became fluid, stirring was started. The water produced during the esterification boiled up the reflux column and the vapor was condensed by the condenser, which was cooled by water. No acetal side reaction product was found in the condensate. There was some propylene glycol carried out with the water vapor.

Acid numbers were taken periodically during the fusion of the reactants to determine the completeness of the reaction. At less than one hour after the mixture had become fluid, at a temperature of 140–160° C., the acid number was 74 milligrams of potassium hydroxide per gram of resin and in three hours of cooking at about 180° C., the acid number was down to 54 milligrams of potassium hydroxide per gram of resin. After 4¾ hours of cooking the fusion was considered finished. The acid number was 29 milligrams of potassium hydroxide per gram of resin. From the acid number, the esterification was calculated to be 93.7% complete. Thus, an uncured, unsaturated polyester reaction product incorporating tetrabromophthalic anhydride was produced.

Into this polyester resin reaction product was mixed 0.104 gram of hydroquinone, a conventional polyester resin gelation inhibitor, and 106.7 grams of styrene, a polyester resin cross-linking agent. The uncured, styrenated unsaturated polyester resin composition is the one which is generally marketed to the ultimate user who subjects it to curing with a conventional polyester resin gelation initiator. It was found that this styrenated, uncured resin had good shelf life.

Upon subjecting this styrenated resin to conventional curing conditions with t-butyl hydroperoxide, a thermoset resin was produced which was comparable to the unhalogenated polyester resins.

The distillate from the fusion reaction of Example II was analyzed and no cyclic acetal was found. Illustrative of the cyclic acetal that is formed when impure tetrabromophthalic anhydride containing a residual acidity was used, is Comparative Example III.

COMPARATIVE EXAMPLE III

The procedure of Example II was repeated using the identical amount of reactants and identical process conditions except that impure, commercial tetrabromophthalic anhydride (M.P. 274–275° C.) was used in place of the pure tetrabromophthalic anhydride. Cyclic acetal formation could easily be noted since the acetal distilled over during the reaction and was condensed as an upper layer on the aqueous distillate. The reaction was continued for about 4½ hours and it was found that the product had an acid number of 89.2 milligrams of potassium hydroxide per gram of resin which indicated the reaction to be only 81% complete. Upon cooling the reaction mass to the point where styrene could otherwise be added, the product was found to exist as a semi-crystalline, hetrogenous mass incapable of being converted into a thermoset resin. The product was completely unsatisfactory when compared to the product of Example II.

Since the impure tetrabromophthalic anhydride was thought to contain a contaminant contributed by oleum, tests were made incorporating sulfuric acid into tetrabromophthalic anhydride purified by the process of Example I. Numerous runs of this type were conducted and it was found in all instances that cyclic side reaction products were formed. This series of runs verified the fact that it was the presence of an impurity contributed by the fuming sulfuric acid used in the commercial manufacture of tetrabromophthalic anhydride which, at least in part, caused the cyclic side reaction products. It was found that the extent of formation of the cyclic side reaction products was approximately proportional to the increasing amount of the sulfuric acid incorporated into the pure tetrabromophthalic anhydride.

These studies further demonstrated that the amount of sulfuric acid left on the surface of the crystals of tetrabromophthalic anhydride produced in the conventional manner is very small compared to that actually occluded in the crystals. In a typical test, 0.03% sulfuric acid was found on the crystal surfaces and 0.22% sulfuric acid found occluded in the crystals themselves.

Other di- and polyhydric alcohols were used repeating the process of Example II. It was found in each case that there was no cyclic ether or cyclic acetal formation.

While the process of Example II provides a very effective means for the formation of the novel polyester resin compositions of the present invention, an attempt was made to eliminate the extensive type of purification procedure shown in Example I. Unexpectedly, it was found that by the incorporation of small amounts of various additives, which neutralized the residual acidity, into impure or commercial tetrabromophthalic anhydride that the purification procedure of Example I could be eliminated. Thus, it was found that if a small amount of an inorganic or organic salt or base was incorporated into impure tetrabromophthalic anhydride that novel polyester compositions incorporating this composition could be produced by the process of the present invention without the formation of the cyclic side reaction products. These additives effectively eliminate the catalytic effect of the acid present in or associated with the impure tetrabromophthalic anhydride.

Illustrative of this process and the novel polyester resin composition produced, is Example IV.

EXAMPLE IV

The procedure of Example II was repeated except that impure tetrabromophthalic anhydride (M.P. 274–275° C.), mixed with 1.5 grams of sodium chloride, was used in place of the purified tetrabromophthalic anhydride. An identical amount of the other reactants was used. The reactants were cooked for five hours and twenty-five minutes at which time the acid number was 38.5 milligrams of potassium hydroxide per gram of resin. The reaction was thus found to be 92% complete. The volatiles in the reaction mass were vacuum distilled from the reaction mass and condensed. There was no cyclic acetal observed on the surface of the condensed water collected from the esterification.

The polyester resin product was mixed with 0.104 gram of hydroquinone, a polyester resin gelation inhibitor, and 106.7 grams of styrene, a polyester resin cross-linking agent. It was found that this styrenated, uncured resin had good shelf life.

Upon subjecting this styrenated resin to curing with a conventional polyester resin initiator, t-butyl hydroperoxide, a strong thermoset polyester resin was produced, whose properties compared favorably with the non-halogenated polyester resins and were superior to those of comparable chlorinated polyester resins. By contrast to the product produced in Comparative Example III, the physical properties of the product of this example were vastly superior.

The process of Example IV was repeated using other organic and inorganic salts and bases in small amounts and in each instance, there was no cyclic acetal formation. Thus, for instance, the following compounds prevented acetal formation: sodium chloride; sodium acetate; sodium hydroxide; disodium tetrabromophthalate; urea; dilute ammonium hydroxide; calcium chloride; cetylpyridinium bromide; benzyltrimethyl ammonium hydroxide; cetyldimethyl amine; and the like. Many other acid neutralizing materials will be apparent to those skilled in the art and all are intended to be included within the scope of the present invention. For economic reasons, sodium chloride is preferred. It was found that in each instance, there was no cyclic acetal formation and that the product produced was superior in all respects to that of Comparative Example III.

It will be appreciated that in the foregoing examples where impure tetrabromophthalic anhydride was used with propylene glycol, the cyclic acetal of propionaldehyde and propylene glycol was formed. It was also found that when ethylene or diethylene glycol were attempted to be reacted or were actually reacted with impure tetrabromophthalic anhydride that the cyclic ether, 1,4-dioxane was produced.

Unexpectedly, it was found that when pure tetrabromophthalic anhydride, or impure tetrabromophthalic anhydride containing inorganic or organic salts or bases in small amounts, were employed, there was no formation of the cyclic ethers as well as no formation of the cyclic acetals. Illustrative is Example V.

EXAMPLE V

The equipment of Example II was used. The flask was charged with 46.4 grams (0.1 mole) of purified tetrabromophthalic anhydride (M.P. 278–284° C.), 14.8 grams (0.1 mole) phthalic anhydride, 27.4 grams (0.28 mole) of maleic anhydride, 19.2 grams (0.31 mole) of ethylene glycol and 32.9 grams (0.31 mole) of diethylene glycol. The cook proceeded smoothly with no cyclic ether (1,4-dioxane) formation. The cook required 7.5 hours to bring the acid number of the reaction mixture to 24 milligrams of potassium hydroxide per gram of resin. The polyester resin product was combined with 0.05 gram of hydroquinone, a gelation inhibitor and 50 grams of styrene. It was found that the styrenated polyester resin had good shelf life. Upon subjecting this styrenated resin to curing with a conventional catalyst, t-butyl hydroperoxide, a thermoset polyester resin product was produced comparable to that formed in Examples II and IV.

The procedure of Example V was repeated using the mixture of impure tetrabromophthalic anhydride with the inorganic or organic salts or bases. It was found that the product was comparable to that produced in Examples II, IV and V, and that it was superior to that produced in Comparative Example III.

The process of Examples II, IV and V was repeated using many other di- and polyhydric alcohols, saturated and unsaturated, with good results. Thus, for instance, ethylene glycol, diethylene glycol, butylene glycol, alone or in mixtures can be used.

It was found that a thermoset resin could be produced without the use of a cross-linking agent by the use of a polyhydric alcohol. Thus, for instance, glycerol (1,2,3-propanetriol); pentaerythritol; tripentaerythritol; trimethylol ethane; trimethylol propane; sorbitol; mannitol, alone or in various combinations with each other and with various di-alcohols can be used satisfactorily. Further, when incorporated with various oils, drying or non-drying, novel alkyd resin products were produced. Thus, using the procedure of Examples II, IV and V various saturated and unsaturated polyester resins were produced by the reaction of tetrabromophthalic anhydride alone or in combination with other aromatic acids or anhydrides such as phthalic anhydride.

The process of Examples II, IV and V was repeated using various organic solvents, such as xylene. It was found that solvent esterification was as effective as the fusion esterification. It will be appreciated, however, that the fusion esterification of Examples II, IV and V is preferred for economic reasons.

There are many different cross-linking agents which can be mixed or blended with the unsaturated polyester resins. The most common cross-linking agents, which can be used alone or in admixture, are the vinyl monomers such as vinyl acetate; styrene; and methyl methacrylate, all of which may be used with good results. However, styrene is preferred for economic reasons.

Unsaturated polyester resins are generally unstable on storage unless suitable gelation inhibitors are used. This was true of the polyester resins of the present invention. The tendency to crosslink and gell was greatly reduced or eliminated by various inhibitors. Examples of such inhibitors found to be satisfactory are: p-tert-butyl catechol; hydroquinone; p-nitroso dimethylaniline, and the like. However, hydroquinone is preferred.

The controlled polymerization of unsaturated polyester resins to yield the fully cured resin is started by the addition of an initiator. Since the final curing is essentially a vinyl-type polymerization, free radical initiators such as the organic peroxides and azo compounds are generally used. Examples of such compounds which were used satisfactorily are: acetyl benzoyl peroxide; peracetic acid; methyl ethyl ketone peroxide; cyclohexanone peroxide; cyclohexyl hydroperoxide; 2,4-dichlorobenzoyl peroxide; cumene hydroperoxide; tert-butyl hydroperoxide; methyl amyl ketone peroxide; lauroyl peroxide; benzoyl peroxide; tert-butyl perbenzoate; di-tert-butyl diperphthalate; p-chlorobenzoyl peroxide; di-tert-butyl peroxide; and dibenzyl peroxide. Many other initiators are available and the use of these initiators is well within the skill of the art and is considered to be included in the scope of the present invention.

The cured thermoset resins such as those in Examples II, IV and V were subjected to tests to determine whether they were self-extinguishing. Primarily, two flammability tests were used. The first was ASTM D-757 which is a well-known conventionally used flammability test. The other flammability test used was a test known as HLT-15. ("Burning Test for Thermosetting Resins," by A. J. Hammerl, a paper before the 17th Annual SPI Technical Management Conference, Reinforced Plastics Division, there termed as the "Intermittent Flame Test.")

The HLT-15 test is designed to determine the self-extinguishing properties of polyester resins in the form of fiber glass mat polyester reinforced laminates. More particularly, five strips measuring 0.125 by 0.5 by 8 inches are used for each material evaluated. The burner used is a 7/16 inch Tirrill which has its flame adjusted to a 1.5 inch inner blue cone with a flame height of approximately 5 inches. The axis of the burner is inclined at an angle of 20° from the vertical.

The specimen is clamped vertically so that the tip of the inner blue cone of the flame just touches the lower end of the specimen. The flame is applied to the specimen and then removed according to the following schedule:

| | On time (seconds) | Off time (seconds) |
|---|---|---|
| Application: | | |
| 1 | 5 | 10 |
| 2 | 7 | 14 |
| 3 | 10 | 20 |
| 4 | 15 | 30 |
| 5 | 25 | 50 |

Whenever the burning is observed to continue longer than the off time, no further flame applications are made to the specimen. Each of the five test ignitions successfully passed by a specimen is worth 20 points toward the rating for that specimen. The highest score is 100. The ratings obtained for the five specimens are averaged and recorded as the rating for the material. It was found that the HLT-15 test was more sensitive than the ASTM D-757 in differentiating between materials that were difficultly flammable.

Various polyester resins prepared by the procedure of Examples II, IV and V, incorporating the same reactants but in varying amounts in order to increase or decrease the percentage of bromine, were tested to determine their flammability. Illustrative of the results of this testing are the values set forth in Table I. All of the resins shown in Table I are composed of varying amounts of tetrabromophthalic anhydride, phthalic anhydride, maleic anhydride and propylene glycol.

TABLE I

| | ASTM D-757 Burning rate (mm./min.) | HLT-15 value |
|---|---|---|
| Percent bromine: | | |
| 8.6 | | 0 |
| 10.6 | 10.5 | 4 |
| 12.1 | | 24 |
| 15.9 | | 40 |
| 18.5 | 3.2 | 100 |
| 23.1 | 2.4 | 100 |

It was found that a sample containing about 12 percent by weight or more bromine was self-extinguishing. It is preferred to incorporate between about 12–26% by weight bromine as tetrabromophthalic anhydride in order to make the resin self-extinguishing.

By comparison, the results are set forth in Table II for a polyester resin based upon chlorendic anhydride, a commonly used commercial chlorine bearing material, rather than on tetrabromophthalic anhydride. These polyester resins contained varying amounts of chlorendic anhydride, phthalic anhydride, maleic anhydride and propylene glycol in order to vary the weight percent of chlorine.

TABLE II

| | ASTM D-757 Burning rate (mm./min.) | HLT-15 |
|---|---|---|
| Percent chlorine: | | |
| 11.5 | 12.0 | |
| 16.8 | 10.8 | |
| 20.5 | | 16 |
| 21.0 | 7.6 | |
| 24.6 | 4.9 | |
| 27.5 | | 36 |
| 29.1 | | 88 |

Thus, it can be seen that the polyester resins of the present invention incorporating bromine in tetrabromophthalic anhydride are much superior to those employing chlorine in chlorendic anhydride. It was found that at least twice as much or more chlorine was necessary to even approach the self-extinguishing properties of the polyester resins of the present invention incorporating tetrabromophthalic anhydride.

Various additives were incorporated into the polyester resins of the present invention in order to improve their self-extinguishing properties. Thus, for instance, antimony oxide in a chlorinated wax; organo antimony compounds, such as triphenyl stilbine and trialkyloxy stilbine in a chlorinated wax; phosphorus tribromide; phosphorus oxychloride; phosphorus trichloride; phosphorus pentachloride; phosphorous acid; phosphoric acid; tricresyl phosphate; triphenyl phosphate; trimethyl phosphite; tributyl phosphate; triethyl phosphate; tris (2-chloroethyl phosphate); tri (propylchloromethyl) phosphonate; pentachlorodiphenyl; hexachloroethane; triallylborate, and the like. All of these compounds can be incorporated into the compositions of the present invention.

For instance, it was found that when triethyl phosphate was added to the polyester resins of the present invention, that they were self-extinguishing at lower weight percent bromine levels. Illustrative of the use of triethyl phosphate are the results set forth in Table III. All of the resins shown in Table III are composed of varying amounts of tetrabromophthalic anhydride, phthalic anhydride, maleic anhydride and propylene glycol.

TABLE III

| | Percent triethyl phosphate | HLT-15 |
|---|---|---|
| Percent bromine: | | |
| 8.6 | 5 | 48 |
| 8.6 | 10 | 80 |
| 12.1 | 5 | 72 |
| 12.1 | 10 | 100 |
| 14.6 | 5 | 100 |
| 15.3 | 5 | 100 |
| 15.4 | 5 | 100 |
| 15.9 | 5 | 100 |

It can be seen from Table III that the polyester resins of the present invention incorporating triethyl phosphate have very excellent flammability properties. It is preferred to incorporate into the resin between 10–18 weight percent bromine and between 2–12 weight percent of an additive, such as triethyl phosphate to impart self-extinguishing properties. Thus, substantial reductions in the weight percent bromine necessary to make the polyester resin self-extinguishing, using tetrabromophthalic anhydride, can be achieved by the use of additives.

When polyester resins incorporating triethyl phosphate and chlorendic anhydride were tested, it was found that substantially more chlorine than bromine was necessary to make the resin completely self-extinguishing. Illustrative are the results set forth in Table IV for a polyester resin incorporating chlorendic anhydride, phthalic anhydride, maleic anhydride and propylene glycol.

TABLE IV

| | Percent triethyl phosphate | ASTM D-757 burning rate (mm./min.) | HLT-15 |
|---|---|---|---|
| Percent chloride: | | | |
| 26.3 | 4.7 | 3.1 | 88 |
| 27.5 | 4.7 | | 100 |

The resins incorporating an additve were tested by the Standard Tunnel Test ASTM E-84-50T. The polyester resins tested contained tetrabromophthalic anhydride, phthalic anhydride, maleic anhydride and propylene glycol in varying amounts to vary the weight percent of bromine. Illustrative of the results are those shown in Table V.

TABLE V

| | Percent triethyl phosphate | Tunnel test flame spread [1] |
|---|---|---|
| Percent bromine: | | |
| 10–12 | 5 | 70 |
| 14.2 | 5 | 46 |
| 16.0 | 5 | 45 |
| 20.0 | 5 | 35 |
| 25.0 | 5 | 30 |

[1] Any flame spread less than 75 is considered self-extinguishing.

Further classification is as follows:

| Classification: | Flame spread |
|---|---|
| Non-combustible | 0–25 |
| Fire-retardant | 25–50 |
| Slow burning | 50–75 |
| Combustible | 75–200 |
| Highly combustible | Over–200 |

The polyester resins of the present invention incorporating an additive, particularly triethyl phosphate, have very superior and unexpectedly superior self-extinguishing properties.

In contrast, the various chlorinated acids or anhydrides in combination with an additive such as triethyl phosphate exhibited a Tunnel Test rating of about 70 for a composition containing at least 26% chlorine and about 5% of an additive such as triethyl phosphate. Without the additive, at least about 30% by weight chlorine was required to yield a Tunnel Test rating of 70.

The resin compositions of the present invention were tested to determine various properties. It was found that the thermoset resins had a Barcol hardness of 43, and a heat distortion temperature of 147° F. The uncured, unsaturated resins in combination with a vinyl monomer and with a gelation inhibitor showed good shelf life. Thus, the polyester resin compositions of the present invention have excellent properties, comparable to the non-halogenated polyester resins and markedly superior to those of corresponding chlorine containing resins.

The tetrabromophthalic anhydride of the present invention which is substantially free from catalytic acidity can be used in applications other than the polyester resins. For instance, it can be used as a cross-linking agent in epoxy resins and for forming various diester reaction products. It will thus be appreciated that the tetrabromophthalic anhydride of the present invention, which is substantially free from catalytic acidity, can be used in this application; but it is preferred to use it in polyester resins.

It will be understood that the foregoing description is only illustrative of the present invention and this invention is limited only by the hereinafter appended claims.

We claim:

1. The composition useful in substitution for pure tetrabromophthalic anhydride which consists essentially of:
   (a) impure, crystalline tetrabromophthalic anhydride containing catalytic acidity from oleum occluded in the crystals which catalyzes side reactions of polyols when the impure, crystalline tetrabromophthalic anhydride is reacted with polyols to produce polyester compositions; and (b) small amounts of a catalytic acidity deactivating material selected from the group consisting of sodium chloride, sodium acetate, sodium hydroxide, dilute ammonium hydroxide and calcium chloride, to deactivate the catalytic acidity of sulfuric acid which catalyzes formation of the cyclic acetal of propionaldehyde and 1, 2-propylene glycol from 1, 2-propylene glycol, the composition having the reactivity of pure tetrabromophthalic anhydride without catalytic acidity occluded in its crystals because of the catalytic acidity deactivating material.

2. The composition of claim 1 wherein the catalytic acidity deactivating material is sodium acetate.

3. The composition of claim 1 wherein the catalytic acidity deactivating material is sodium chloride.

4. The composition of claim 1 wherein the catalytic acidity deactivating material is sodium hydroxide.

5. The composition of claim 1 wherein the catalytic acidity deactivating material is dilute ammonium hydroxide.

6. The composition of claim 1 wherein the catalytic acidity deactivating material is calcium chloride.

7. The process for eliminating the effect of the catalytic acidity in impure crystalline tetrabromophthalic anhydride, produced by the bromination of phthalic anhydride in oleum and containing catalytic acidity from the oleum occluded in the crystals, which catalyzes side reactions of polyols when the impure, crystalline tetrabromophthalic anhydride is reacted with polyols to produce polyester compositions, to produce a composition useful in substitution for pure tetrabromophthalic anhydride which process consists essentially of: providing in admixture with the impure tetrabromophthalic anhydride small amounts of a catalytic acidity deactivating material selected from the group consisting of sodium chloride, sodium acetate, sodium hydroxide, dilute ammonium hydroxide and calcium chloride to deactivate the catalytic acidity of sulfuric acid which catalyzes formation of the cyclic acetal of propionaldehyde and 1, 2-propylene glycol from 1, 2-propylene glycol, the resulting composition having the reactivity of pure tetrabromophthalic anhydride without catalytic acidity occluded in its crystals because of the catalytic acidity deactivating material.

8. The process of claim 7 wherein the catalytic acidity deactivating material is sodium acetate.

9. The process of claim 7 wherein the catalytic acidity deactivating material is sodium chloride.

10. The process of claim 7 wherein the catalytic acidity deactivating material is sodium hydroxide.

11. The process of claim 7 wherein the catalytic acidity deactivating material is dilute ammonium hydroxide.

12. The process of claim 7 wherein the catalytic acidity deactivating material is calcium chloride.

References Cited

UNITED STATES PATENTS

| 3,194,817 | 7/1965 | Hahn et al. | 260—346.3 |
| 2,547,505 | 4/1951 | Steahly et al. | 260—346.3 |
| 2,164,851 | 7/1939 | Yabroff et al. | 252—192 |

HERBERT B. GUYNN, Primary Examiner

U.S. Cl. X.R.

252—8.1, 189, 193; 260—75, 346.3, 475, 865, 869